(12) United States Patent
Beall

(10) Patent No.: US 11,994,200 B1
(45) Date of Patent: May 28, 2024

(54) CONCENTRIC ELECTRIC-MOTOR DRIVESHAFT SYSTEM AND METHOD

(71) Applicant: Textron Innovations Inc., Providence, RI (US)

(72) Inventor: Grant Michael Beall, Plano, TX (US)

(73) Assignee: Textron Innovations Inc., Providence, RI (US)

(*) Notice: Subject to any disclaimer, the term of this patent is extended or adjusted under 35 U.S.C. 154(b) by 0 days.

(21) Appl. No.: 17/984,610

(22) Filed: Nov. 10, 2022

(51) Int. Cl.
| | |
|---|---|
| *F16H 57/00* | (2012.01) |
| *F16D 3/06* | (2006.01) |
| *F16D 9/08* | (2006.01) |
| *H02K 7/116* | (2006.01) |
| *B64D 27/24* | (2006.01) |

(52) U.S. Cl.
CPC .......... *F16H 57/0025* (2013.01); *F16D 3/06* (2013.01); *F16D 9/08* (2013.01); *H02K 7/116* (2013.01); *B64D 27/24* (2013.01)

(58) Field of Classification Search
CPC ....... F16H 57/0025; F16H 2057/02034; F16D 3/06; F16D 9/08; B64D 27/24; B64D 35/08; H02K 7/116; H02K 16/00; H02K 2213/06
USPC ........................................................ 310/112
See application file for complete search history.

(56) References Cited

U.S. PATENT DOCUMENTS

| | | | | |
|---|---|---|---|---|
| 2010/0187929 | A1* | 7/2010 | Hishida | H02K 16/00 |
| | | | | 310/112 |
| 2011/0273043 | A1* | 11/2011 | Raad | H02K 16/00 |
| | | | | 310/83 |
| 2019/0190350 | A1* | 6/2019 | Ito | H02K 7/116 |
| 2020/0169150 | A1* | 5/2020 | Mizushita | H02K 15/02 |

FOREIGN PATENT DOCUMENTS

| | | | | |
|---|---|---|---|---|
| CN | 105553202 | A * | 5/2016 | |
| CN | 112531999 | A * | 3/2021 | H02K 16/00 |

OTHER PUBLICATIONS

CN 112531999 A (Lei Li) Dec. 14, 2020 (full text). [online] [retrieved on Jan. 25, 2024]. Retrieved from: Clarivate Analytics. (Year: 2020).*

* cited by examiner

*Primary Examiner* — Joseph Brown
(74) *Attorney, Agent, or Firm* — Bradley Arant Boult Cummings LLP

(57) ABSTRACT

An electric-motor system includes a forward electric-motor assembly, a rear electric-motor assembly arranged in series relative to the forward electric-motor assembly, a forward electric-motor driveshaft splined to the forward electric-motor assembly and comprising a forward electric-motor drive-shaft shear section, and a rear electric-motor driveshaft splined to the rear electric-motor assembly and comprising a rear electric-motor drive-shaft shear section, at least a portion of the rear electric-motor driveshaft arranged concentrically within the forward electric-motor driveshaft. The forward electric-motor driveshaft and the rear electric-motor driveshaft rotate about a common axis.

11 Claims, 3 Drawing Sheets

CONCENTRIC ELECTRIC-MOTOR DRIVESHAFT SYSTEM AND METHOD

TECHNICAL FIELD

The present disclosure relates generally to electric motors and more particularly, but not by way of limitation, to electric motors that employ a concentric electric-motor driveshaft arrangement that permits the electric motors to continue to operate in the event of a failure of a component thereof.

BACKGROUND

This section provides background information to facilitate a better understanding of the various aspects of the disclosure. It should be understood that the statements in this section of this document are to be read in this light and not as admissions of prior art.

Electrically powered rotorcraft use electric motors to power rotors or fans for propulsion. In some electric rotorcraft, electric motors are stacked in series on a common shaft and directly drive a rotor, fan, or gearbox of the electric rotorcraft. For certification of some electric rotorcraft, a motor system must accommodate a failure such as a jam, binding, or other degradation of performance of a component (e.g., a bearing) of the electric motor and still allow other electric motors and drivetrain components to operate. In the past, this objective has been accomplished by integration of a clutch such as, for example, a sprag clutch or other mechanism into each motor. However, such mechanisms can increase cost and weight, as well as consume significant valuable space within the motor system.

SUMMARY

This summary is provided to introduce a selection of concepts that are further described below in the detailed description. This summary is not necessarily intended to identify key or essential features of the claimed subject matter, nor is it intended to be used as an aid in limiting the scope of claimed subject matter.

An electric-motor system includes a forward electric-motor assembly, a rear electric-motor assembly arranged in series relative to the forward electric-motor assembly, a forward electric-motor driveshaft splined to the forward electric-motor assembly and comprising a forward electric-motor drive-shaft shear section, and a rear electric-motor driveshaft splined to the rear electric-motor assembly and comprising a rear electric-motor drive-shaft shear section, at least a portion of the rear electric-motor driveshaft arranged concentrically within the forward electric-motor driveshaft. The forward electric-motor driveshaft and the rear electric-motor driveshaft rotate about a common axis.

An electric-motor drive method includes driving a gearbox, by a forward electric-motor assembly, via a forward electric-motor driveshaft splined to the forward electric-motor assembly, the forward electric-motor driveshaft comprising a forward electric-motor drive-shaft shear section and driving the gearbox, by a rear electric-motor assembly arranged in series relative to the forward electric-motor assembly, via a rear electric-motor driveshaft splined to the rear electric-motor assembly, the rear electric-motor driveshaft comprising a rear electric-motor drive-shaft shear section. At least a portion of the rear electric-motor driveshaft is arranged concentrically within the forward electric-motor driveshaft. The forward electric-motor driveshaft and the rear electric-motor driveshaft rotate about a common axis.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein.

In a typical embodiment, an electric-motor system includes a plurality of electric motors arranged in series along a plurality of concentric driveshafts. Each of the plurality of concentric driveshafts includes a shear section. In a two-drive-shaft embodiment, a first of the driveshafts splines onto an inner-diameter ("ID") spline of a gearbox input gear and a second of the driveshafts splines onto an outer-diameter ("OD") spline of the gearbox input gear in order to independently drive two stacked electric motors. The term independent means that a jam of one of the electric motors causes a corresponding one of the driveshafts to shear such that the jammed electric motor is allowed to freewheel and a remaining electric motor to continue to rotate and transmit torque to the gearbox. A typical system utilizes two motors, although embodiments using more than two motors and corresponding concentric driveshafts are possible. Arrangements as set forth herein permit a failure-resistant electric-motor system to be achieved while avoiding cost, weight, and space constraints of clutch systems previously employed.

Figure 1:
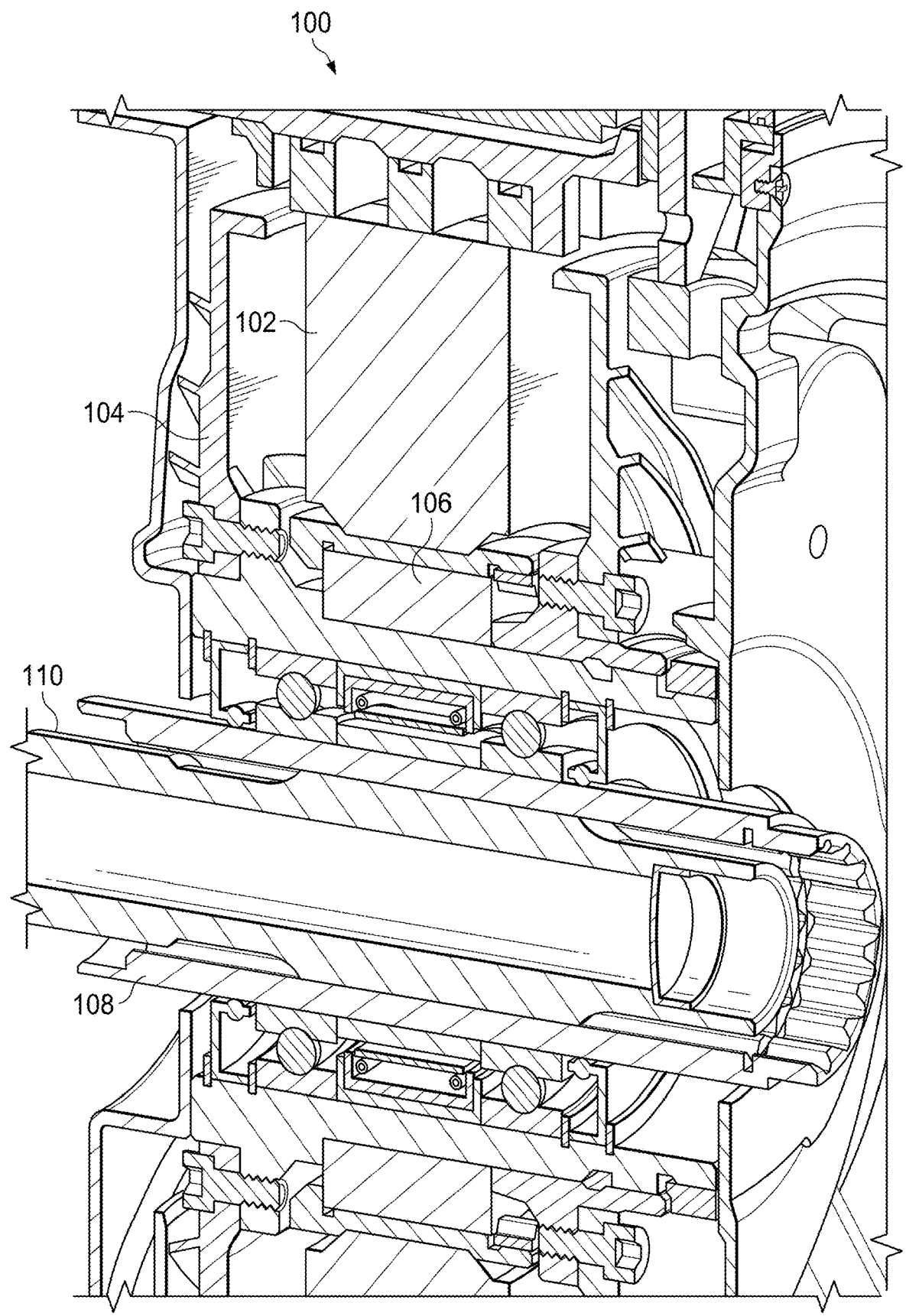
FIG. 1 is a partial perspective cross-sectional view of a prior-art electric motor.

FIG. 1 is a partial perspective cross-sectional view of a prior-art electric-motor assembly. An electric-motor assembly 100 includes a stator 102, a rotor carrier/magnet assembly 104, a motor bearing 106, a sprag clutch 108, and a driveshaft 110. The electric-motor assembly 100 transmits torque to a gearbox (not shown) via rotation of the driveshaft 110 through the sprag clutch 108.

Electric-motor assemblies 100 such as that illustrated in FIG. 1 may be stacked in series on a common driveshaft (e.g., the driveshaft 110) and direct drive a rotor, fan, or gearbox. For certification, an electric-motor system that includes a plurality of electric-motor assemblies needs to accommodate a motor jam or binding and still allow the other electric-motor assemblies of the electric-motor system and drive train to operate normally. This objective has previously been accomplished by integration of a clutch mechanism such as, for example, the sprag clutch 108, onto each electric-motor assembly. However, such clutch mechanisms can increase cost, weight, and space consumed by the electric-motor system.

Figure 2:
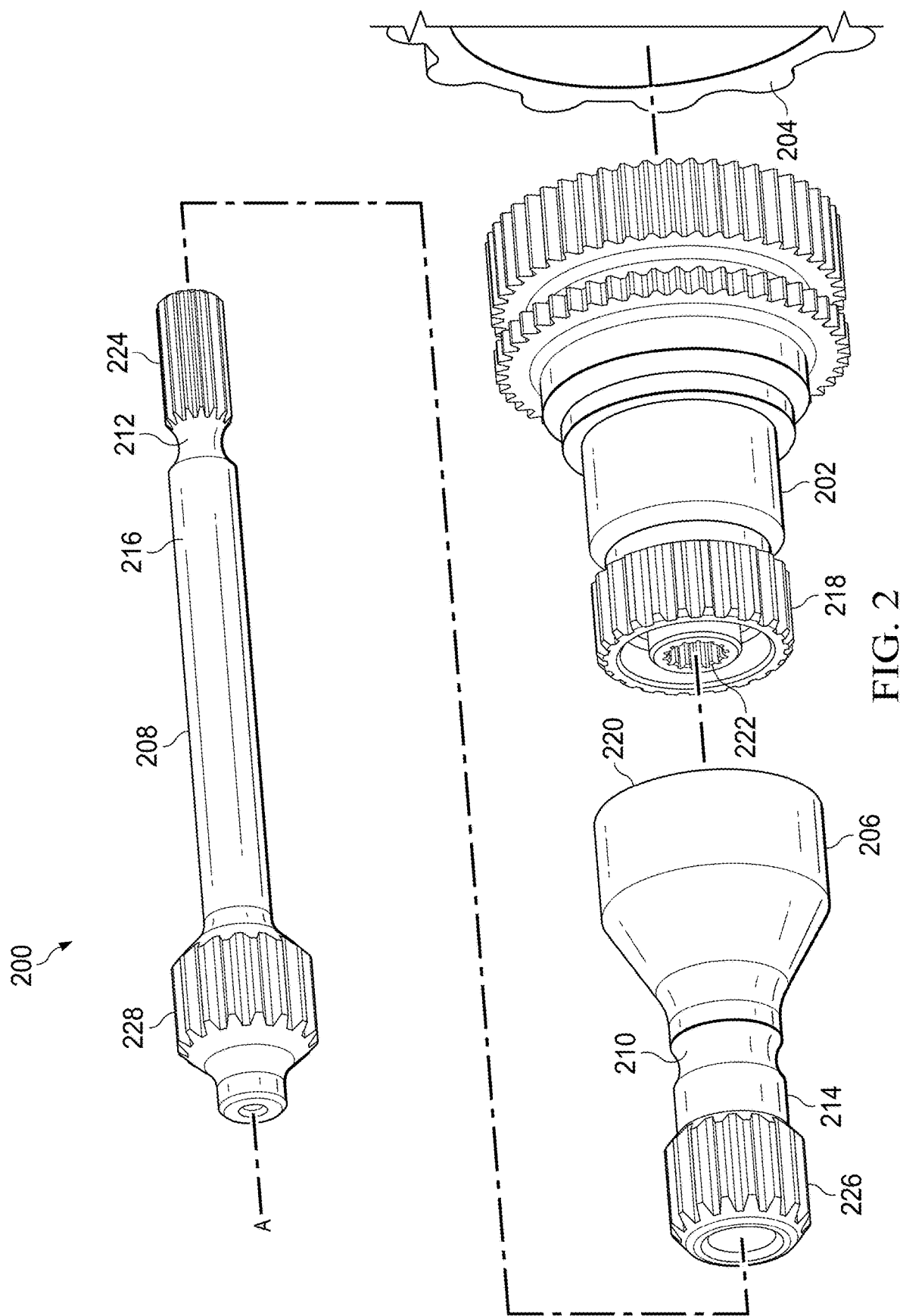
FIG. 2 is an exploded perspective view of a concentric driveshaft system for use with an electric-motor system.

FIG. 2 is an exploded perspective view of a concentric drive-shaft system for use with an electric-motor system. A concentric drive-shaft system 200 includes an input gear 202. The input gear 202 is illustrated adjacent to a gearbox 204, which is illustrated only in part. The input gear 202 splines onto an inner-diameter spline of the gearbox 204. The concentric drive-shaft system 200 also includes a forward electric-motor driveshaft 206 and a rear electric-motor driveshaft 208. The forward electric-motor driveshaft 206 surrounds the rear electric-motor driveshaft 208 such that the forward electric-motor driveshaft 206 and the rear electric-motor driveshaft 208 may rotate independently relative to one another about a common axis A when disconnected from the gearbox 204 and disconnected from any electric-motor assembly. In similar fashion, the forward electric-motor driveshaft 206 and a rear electric-motor driveshaft 208, when connected to the gearbox 204 via the input gear 202 and to respective electric-motor assemblies, drive the gearbox 204.

The forward electric-motor driveshaft 206 includes a shear section 210 and the rear electric-motor driveshaft 208 includes a shear section 212. The shear section 210 is illustrated as having a smaller outer diameter than an adjacent section 214 of the forward electric-motor driveshaft 206. In similar fashion, the shear section 212 is illustrated as having a smaller outer diameter than an adjacent section 216 of the rear electric-motor driveshaft 208. Dimensions of the adjacent sections 214 and 216 and the shear sections 210 and 212 may be tuned to permit the forward electric-motor driveshaft 206 and the rear electric-motor driveshaft 208 to shear in response to an increase in torque due, for example, to a jam of an electric-motor assembly driven by the respective one of the forward electric-motor driveshaft 206 and the rear electric-motor driveshaft 208 and still permit a remaining one of the forward electric-motor driveshaft 206 and the rear electric-motor driveshaft 208 to continue to be driven by its respective electric-motor assembly. Each of the shear sections 210 and 212 is illustrated as being concave in shape when viewed normally to the common axis A; however, other shapes of shear sections may be used in accordance with design considerations. Although various portions of the forward electric-motor driveshaft 206 and the rear electric-motor driveshaft 208 are illustrated and described as being nominally circular in cross-section, this need not necessarily be the case.

The forward electric-motor driveshaft 206 is adapted to spline onto an OD spline 218 on the input gear 202 via an input-gear ID spline 220, the input-gear ID spline 220 not being visible in FIG. 2. In analogous fashion, the rear electric-motor driveshaft 208 is adapted to spline onto an ID spline 222 via an input-gear OD spline 224. The forward electric-motor driveshaft 206 has formed therein a motor OD spline 226 that is adapted to engage with an ID spline of an electric-motor assembly. The rear electric-motor driveshaft 208 has formed therein a motor OD spline 228 that is adapted to engage with an electric-motor assembly. In a typical embodiment, the motor OD spline 226 and the motor OD spline 228 are identical to one another, although this need not necessarily be the case. The forward electric-motor driveshaft 206 and the rear electric-motor driveshaft 208 combine to independently drive two series-stacked electric-motor assemblies into the single input gear 202. As such, a jam of a single electric-motor assembly causes a corresponding driven electric-motor driveshaft 206 or 208 to shear and allow the remaining driven electric-motor driveshaft 206 or 208 to continue to rotate and transmit torque to the gearbox 204. Although only two electric-motor driveshafts, namely, the forward electric-motor driveshaft 206 and the rear electric-motor driveshaft 208, are illustrated, more than two concentric electric-motor driveshafts could be employed under certain conditions.

The shear section 210 and the shear section 212 are each adapted to withstand more than a maximal load expected during operation of the forward electric-motor driveshaft 206 and the rear electric-motor driveshaft 208; however, if, for example, a jam, binding, or other failure of an electric-motor assembly were to occur, a consequent impulse load would cause the corresponding shear section 210 or the shear section 212 to shear such that the forward electric-motor driveshaft 206 and the rear electric-motor driveshaft 208 would break and rotationally disconnect the electric-motor assembly that has experienced, for example, a jam or binding, from the gearbox 204. Design factors such as materials, shape, and dimensions of the forward electric-motor driveshaft 206 and the rear electric-motor driveshaft 208 would depend, among other things, on expected loads as well as dimensions of the corresponding electric-motor assemblies.

In a typical embodiment, a major-diameter fit on all splines is employed in an effort to ensure that, in the event of a jam or binding, and consequent shearing of shear section 210 or shear section 212, the sheared forward electric-motor driveshaft 206 or the sheared rear electric-motor driveshaft 208 will not touch or damage other components. A sheared shaft can become unbalanced and lead to excessive vibration or motion. A major diameter fit creates a tight interface on the splines and will hold the shaft in a very tight tolerance alignment even in the event of a shaft shear.

Figure 3:
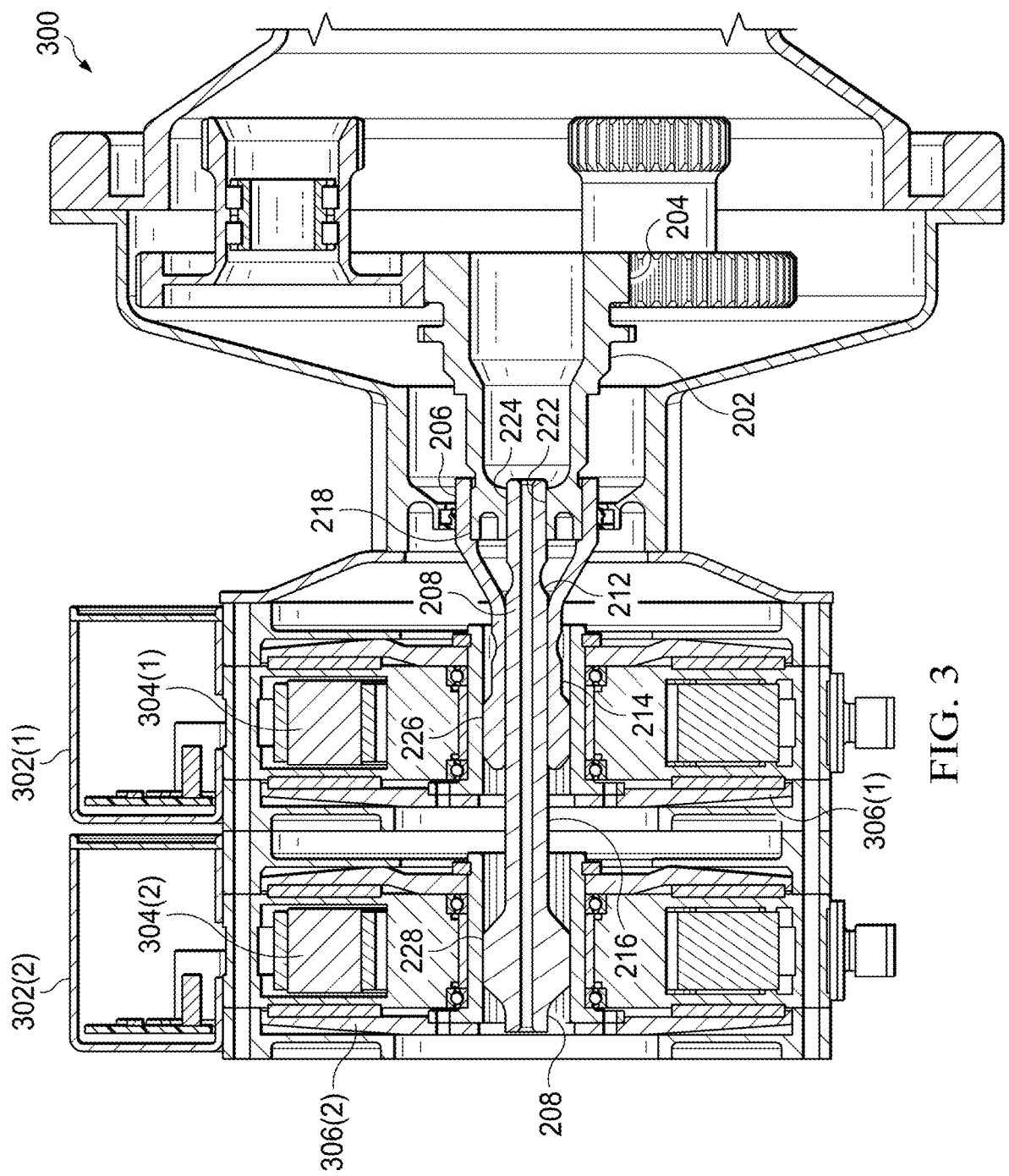
FIG. 3 is a cross-sectional view of an electric-motor system that includes a plurality of electric-motor assemblies and the concentric driveshaft system of FIG. 2.

FIG. 3 is a cross-sectional view of an electric-motor system that includes a plurality of electric-motor assemblies and the concentric driveshaft system of FIG. 2. An electric-motor system 300 includes the input gear 202, the gearbox 204, the forward electric-motor driveshaft 206, the rear electric-motor driveshaft 208, a forward electric-motor assembly 302(1), and a rear electric-motor assembly 302(2). In the electric-motor system 300, the forward electric-motor assembly 302(1) and the rear electric-motor assembly 302(2) are modular assemblies that share many identical components and are substantially similar to one another, although this need not necessarily be the case.

The forward electric-motor assembly 302(1) includes a stator 304(1) and a rotor carrier/magnet assembly 306(1), while the rear electric-motor assembly 302(2) includes a stator 304(2) and a rotor carrier/magnet assembly 306(2). Various details of the forward electric-motor assembly 302(1) and the rear electric-motor assembly 302(2) are not discussed in detail herein in order to avoid obscuring salient aspects of the disclosure.

The OD spline 218 and the ID spline 222 of the input gear 202 are shown engaged with the input-gear ID spline 220 and the input-gear OD spline 224, respectively. The forward electric-motor driveshaft 206 and the rear electric-motor driveshaft 208 rotate independently of one another when one or both of the shear sections 210 and 212 have sheared responsive to an impulse load due, for example, to a jam or binding of the forward electric-motor assembly 302(1) or the rear electric-motor assembly 302(2). A comparison of the forward electric-motor assembly 302(1) and the rear electric-motor assembly 302(2) to the electric-motor assembly 100 demonstrates that the removal of the sprag clutch and addition of the forward electric-motor assembly 302(1) or the rear electric-motor assembly 302(2) provides additional volume in the vicinity of the stator 304(1) and stator 304(2) relative to the stator 102.

Conditional language used herein, such as, among others, "can," "might." "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. For purposes of this patent application, the terms connected and connection require physical contact between components; in contrast, the term interoperably coupled does not necessarily require physical contact between components and may also encompass one or more intermediate components between components that are said to be interoperably coupled relative to one another.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. An electric-motor system comprising:
   a forward electric-motor assembly;
   a rear electric-motor assembly arranged in series relative to the forward electric-motor assembly;
   a forward electric-motor driveshaft splined to the forward electric-motor assembly and comprising a forward electric-motor drive-shaft shear section; and
   a rear electric-motor driveshaft splined to the rear electric-motor assembly and comprising a rear electric-motor drive-shaft shear section, at least a portion of the rear electric-motor driveshaft arranged concentrically within the forward electric-motor driveshaft;
   wherein the forward electric-motor driveshaft and the rear electric-motor driveshaft rotate about a common axis;
   wherein the forward electric-motor driveshaft comprises an inner-diameter spline splined to an outer-diameter spline of an input gear; and
   wherein the rear electric-motor driveshaft comprises an outer-diameter spline splined to an inner-diameter spline of the input gear.

2. The electric-motor system of claim 1, wherein the forward electric-motor driveshaft and the rear electric-motor driveshaft are each interoperably coupled via the input gear to a gearbox to be driven by the forward electric-motor assembly and the rear electric-motor assembly.

3. The electric-motor system of claim 2, wherein the forward electric-motor drive-shaft shear section shears responsive to an impulse load greater than a maximal expected operational load on the forward electric-motor driveshaft.

4. The electric-motor system of claim 3, wherein the rear electric-motor drive-shaft shear section shears responsive to an impulse load greater than a maximal expected operational load on the rear electric-motor driveshaft.

5. The electric-motor system of claim 4, wherein, responsive to shearing of the rear electric-motor drive-shaft shear section, the rear electric-motor assembly is rotationally disconnected from the input gear.

6. The electric-motor system of claim 3, wherein, responsive to shearing of the forward electric-motor drive-shaft shear section, the forward electric-motor assembly is rotationally disconnected from the input gear.

7. The electric-motor system of claim 1, wherein:
   the forward electric-motor driveshaft is splined to the forward electric-motor assembly via a forward electric-motor outer-diameter spline; and
   the rear electric-motor driveshaft is splined to the rear electric-motor assembly via a rear electric-motor outer-diameter spline.

8. The electric-motor system of claim 1, wherein the forward electric-motor drive-shaft shear section and the rear electric-motor drive-shaft shear section are concave in shape.

9. An electric-motor system comprising:
   a forward electric-motor assembly;
   a rear electric-motor assembly arranged in series relative to the forward electric-motor assembly;
   a forward electric-motor driveshaft splined to the forward electric-motor assembly and comprising a forward electric-motor drive-shaft shear section;
   a rear electric-motor driveshaft splined to the rear electric-motor assembly and comprising a rear electric-motor drive-shaft shear section, at least a portion of the rear electric-motor driveshaft arranged concentrically within the forward electric-motor driveshaft;
   wherein the forward electric-motor driveshaft and the rear electric-motor driveshaft rotate about a common axis; and
   an input gear splined to the forward electric-motor driveshaft and to the rear electric-motor driveshaft.

10. The electric-motor system of claim 9, wherein:
    the forward electric-motor driveshaft is splined to an outer-diameter spline of the input gear, and
    the rear electric-motor driveshaft is splined to an inner-diameter spline of the input gear.

11. The electric-motor system of claim 10, comprising a gearbox splined to the input gear and that receives torque from the forward electric-motor assembly and the rear electric-motor assembly.

* * * * *